Nov. 26, 1963 F. DE JAGER ETAL 3,112,462

VOLUME COMPRESSION BY PULSE DURATION MODULATION AND SUBSEQUENT DEMODULATION

Filed Sept. 29, 1960 2 Sheets-Sheet 1

INVENTOR
Frank de Jager.
Petrus J. van Gerwen.
BY
Frank R. Jifani
AGENT

Nov. 26, 1963 F. DE JAGER ETAL 3,112,462

VOLUME COMPRESSION BY PULSE DURATION MODULATION AND SUBSEQUENT DEMODULATION

Filed Sept. 29, 1960 2 Sheets-Sheet 2

INVENTOR
Frank de Jager
Petrus J. van Gerwen
BY
AGENT

United States Patent Office 3,112,462

Patented Nov. 26, 1963

3,112,462

VOLUME COMPRESSION BY PULSE DURATION MODULATION AND SUBSEQUENT DEMODULATION

Frank de Jager and Petrus Josephus v. Gerwen, Eindhoven, Netherlands, assignors to North American Philips Company, Inc., New York, N.Y., a corporation of Delaware Filed Sept. 29, 1960, Ser. No. 59,445

Claims priority, application Netherlands Oct. 2, 1959

7 Claims. (Cl. 333—14)

This invention relates to a device for volume compression of information signals, in particular of speech signals, the volume compression device comprising a compression voltage rectifier supplied by the information signals to produce the compression voltage which controls the volume compression device.

In such devices, the information signals for volume compression are attenuated in accordance with the compression voltage in a variable attenuator, the attenuation degree of which at high compression factors must vary between wide limits. Particularly at these high compression factors, for example at a compression factor of 5 or more measured in db, these devices for volume compression show practical difficulties, for example, signal distortions appear to occur in such compression devices which influence the transmission quality disturbingly.

The object of this invention is to provide a different design of a device for volume compression, in which, together with a simple construction, even at very high compression factors an optimal freedom from distortion is realized.

The device according to the invention is characterized in that the output voltage of the compression voltage rectifier is supplied to a push-pull amplitude modulator with a sub-carrier oscillator connected to it which oscillator supplies a sub-carrier frequency lying outside the information signal band, the output voltage of the push-pull amplitude modulator, together with the information signals, being supplied to an amplitude limiter, while the output circuit of the limiter comprises a selection filter serving to select the information signal band.

Figure 1:
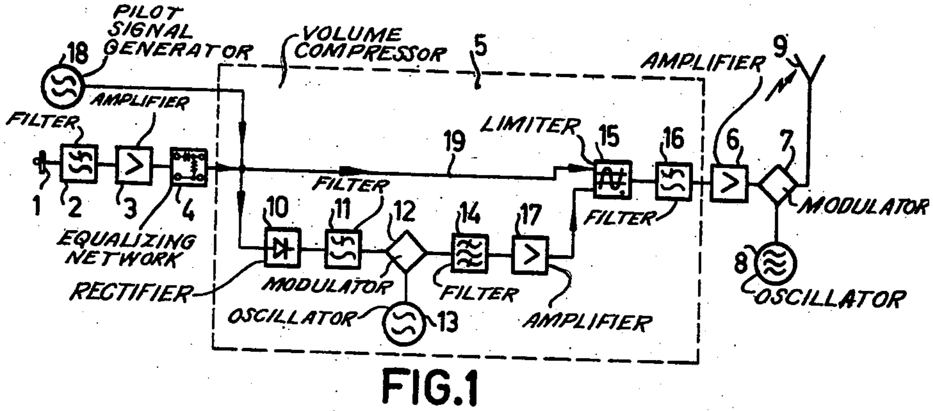
Figure 2:
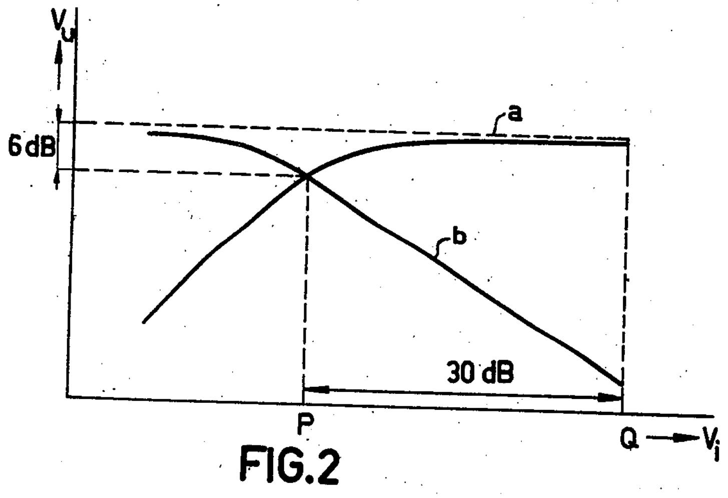
Figure 4:
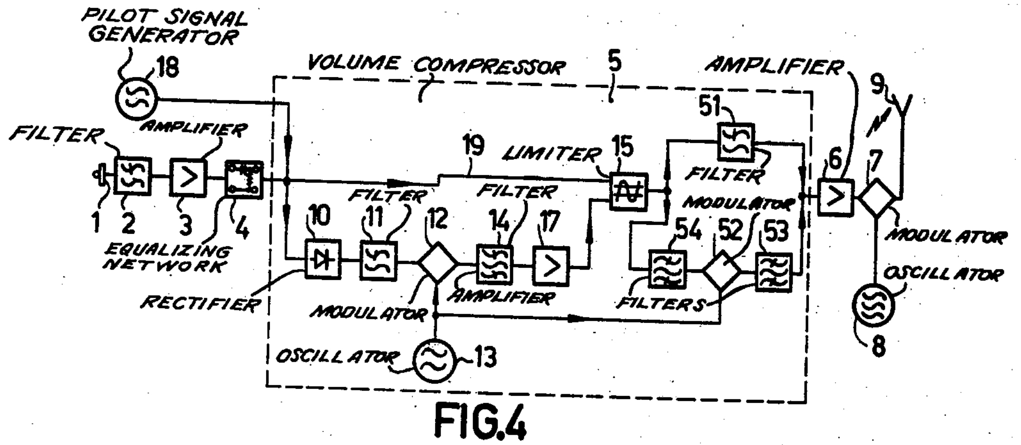
Figure 3:
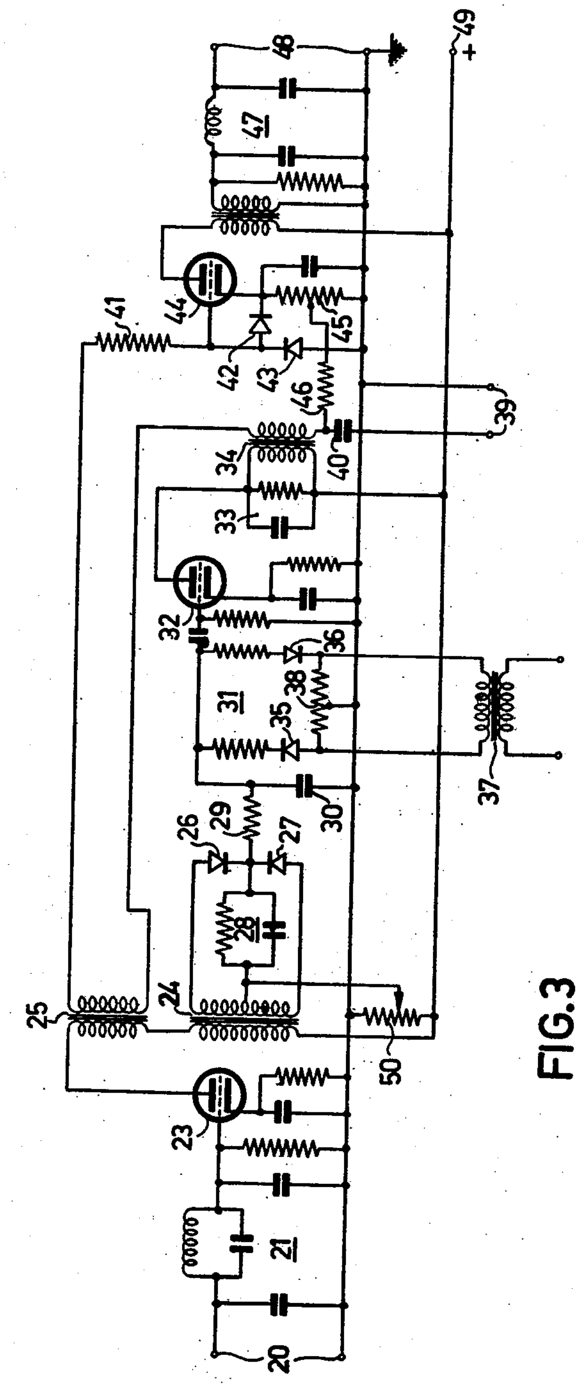

In order that the invention may be readily carried into effect, it will now be described, by way of example, with reference to the accompanying drawings, in which FIGURE 1 is a block schematic view of a transmitter provided with a device for volume compression according to the invention, FIGURE 2 shows the compression characteristic of the device used for volume compression, FIGURE 3 shows a detailed view of the volume compression device shown in FIGURE 1, and FIGURE 4 is a further embodiment of the transmitter shown in FIGURE 1.

The transmitter shown in FIGURE 1 is meant for transmission by amplitude modulation of speech signals lying for example in the speech frequency band of 0.3–3.4 kc./s.

In this transmitter, the speech signals from a microphone are supplied, via a filter 2 passing the speech signals and having a pass band of 0.3–3.4 kc./s., to a low frequency amplifier 3 which, in the output circuit, comprises a network 4 differentiating signals frequencies and serving to equalize the amplitude characteristic. The amplified speech signals in the pass band of 0.3–3.4 kc./s. are amplified, after volume compression in a volume compression device 5, in a transmitter amplifier 6 and supplied, as modulation voltage, to a transmitter stage 7 connected to a carrier wave oscillator 8 which is coupled to a transmission aerial 9.

For volume compression, the volume compression device 5 comprises a compression voltage rectifier 10 supplied by the speech signals and having a charging time constant and a discharge time constant of the same order, for example of approximately 2 msec, succeeded by an associated low-pass filter 11 having a limit frequency of for example 100 c./s. In this manner, a compression voltage which accurately follows the envelope of the speech signals is set up at the output circuit of the volume compression voltage rectifier 10, 11 by rectifying the speech signals.

For volume compression, the output voltage in the device 5 of the compression voltage rectifier 10, 11 is supplied, as modulation voltage, to a push-pull modulator connected to an auxiliary oscillator 13 having a frequency of 20 kc./s., which modulator comprises an output filter 14 having a pass band of 19.8–20.2 kc./s. to select the compression voltage modulated in amplitude on the subcarrier frequency. The output voltage of the push-pull amplitude modulator 12 which varies in its amplitude directly proportional to the compression voltage, is supplied, together with the speech signals, to an amplitude limiter 15 via lead 19, thus effecting a compression of the speech signals supplied to said limiter, which signals are selected via a selection filter 16 in the form of a low-pass filter.

If provision has been made that the output voltage of the push-pull modulator 12 is supplied to the input of the limiter 15 with larger amplitude than the speech signals, for example by including an amplification stage 17 in the output circuit of the push-pull modulator 12, a series of successive pulses in the frequency of the subcarrier frequency of 20 kc./s. appear at the output of the limiter 15 by limiting the output voltage of the push-pull modulator 12, the duration of which pulses varies in accordance with the instantaneous value of the speech signals. The extent of the overall variation of the duration of the pulses produced is determined by the amplitude ratio of the speech signals and the output voltage of the push-pull modulator 12 and has a constant value in the device shown, if, for example, the level of the speech signal decreases by a given factor, the level of the output signal of the push-pull modulator 12 decreases by the same factor, whereas conversely, if the level of the speech signal increases by a given factor, also the level of the output voltage of the push-pull modulator 12 increases by the same factor. Independently of the speech level, the total variation of the duration of the duration-modulated pulse series shows a constant value and consequently also the level of the speech signals obtained in the selection filter 16 by demodulation of the duration-modulated pulse series, so that a volume compression with a very high compression factor is realized. The constant output level of the volume compression device 5 is of particular advantage for various applications, for example to obtain an optimal transmitter drive, to reduce the influence of noise voltages, and the like. If necessary level variations remaining after the selection filter 16 may be completely avoided by using a limiter.

In the device for volume compression described, which is realized via the linear processes of a pulse duration modulation and a successive pulse duration demodulation, signal distortions are reduced to a very high extent. The freedom from distortion in particular may be increased in a simple manner to a maximum value by seeing to it that the amplitude of the output signal of the push-pull modulator 12 is a few times, for example four times, larger than the level of the speech signal and making also the frequency of the sub-carrier oscillator 13 at least three times higher than the highest speech signal frequency, for example, the sub-carrier frequency amounts to 20 kc./s.

To characterize the compression of the speech signals, the input of the amplitude limiter 15 is connected in accordance with the invention to a pilot signal generator 18 having a frequency of for example 3.7 kc./s. lying outside the speech band, which pilot signal generator 18 in the form as shown is also coupled to the input of the compression voltage rectifier 10. The level of the pilot signal is chosen considerably lower, for example 20 db lower than the speech signals at normal speech level.

If in this device the speech level lies above the pilot level, the volume rectifier 10, 11 supplies substantially a compression voltage varying with the level of the speech signals and a volume compression occurs in the manner as described above, that is to say that the varying level of the speech signals is adjusted to a constant value, while the constant pilot signal is converted into a pilot signal, the amplitude of which varies inversely proportional to the speech level. If the speech level falls below the pilot level, the compression voltage is substantially supplied by the constant pilot voltage and no volume compression occurs, that is to say that the speech signals are transmitted without volume compression and the pilot signal has a constant value. The compression of the speech signal is thus accurately characterized by the amplitude of the pilot signal, as a result of which it is rendered possible in a simple manner to regain the speech signals faithfully at the receiver end, in spite of the very high compression factor, by using an expansion control in accordance with the pilot signal. The overall output level of the volume compression device which is constituted now by speech level and pilot level, remains constant.

FIGURE 2 shows the control characteristic of the compression device as shown, in which the pilot level occurring at the selection filter and the level of the speech signal $V_u$ is plotted in db in accordance with the level $V_i$ of the speech signals supplied to the input of the volume compression device 5.

As already explained above, volume compression in the volume compression device as described only occurs at a speech level above the pilot level, which in the figure is indicated by the point P, whereas below this level no volume compression is obtained. In that case the curve *a* shows the variation of the speech level and the curve *b* the level variation of the pilot signal, while PQ indicates the volume compression control range which, in the embodiment shown, amounts to approximately 30 db.

The lower limit P of the compression on control range PQ is determined by the level of the pilot signal, in other words, by adjusting the pilot level, for example by means of a potentiometer, the control of the compression device may be adjusted at will; by limiting the control range it is achieved i.e. that the interference signals, for example room noise, during the speech intervals, are transmitted only with attenuation.

Besides by supplying the pilot signal to the compression voltage rectifier 10, 11 to limit the compression control range as in the embodiment shown in FIGURE 1, the limiting of the compression control range may also be effected in another manner, for example by supplying a fraction of the carrier wave oscillation of the auxiliary oscillator 13 to the output of the output filter 14, via a variable attenuator.

FIGURE 3 shows a detailed embodiment of the volume compression device shown in block schematic view in FIGURE 1.

In the volume compression device shown, the speech signals are supplied, via the input terminal 20, to a low-pass filter 21 having a limit frequency of 3.4 kc./s. which is connected to the control grid of a triode 23 arranged as a low-frequency amplifier.

In the anode circuit of the triode 23 is included the series combination of the primary windings of two transformers 24, 25, the transformers 24, 25 for amplitude equalization also serving as signal frequency differentiating networks. On the transformer 24 a compression voltage rectifier is included in push-pull construction with rectifier cells 26, 27 and an output impedance 28 which, via an associated low-pass filter provided with a series resistor 29 and a capacitor 30 having a limit frequency of 100 c./s. is connected to a push-pull modulator 31. The push-pull modulator in this case is provided with two rectifier cells 35, 36 of opposite polarities which, via a transformer 37, is connected to a sub-carrier oscillator of 20 kc./s. (not shown) while between the two rectifier cells 35, 36 a series resistor 38 is included, a centre tapping of which is connected to earth. In the push-pull modulator 35, 36 the compression voltage is modulated in amplitude on the sub-carrier frequency of 20 kc./s. and after amplification in an amplifier 32 transmitted to a coupling coil 34 via a damped circuit 33 having a pass-band of 19.8–20.2 kc./s. connected in the anode circuit of the amplifier.

In series combination with the compression voltage modulated on the sub-carrier frequency, the speech signals from the transformer 25 and a pilot voltage of 3.7 kc./s. from input terminals 39 and a blocking capacitor 49 are supplied, via a resistor 41, to a limiter which is formed by two rectifiers 42, 43 in the control grid circuit of the triode amplifier 44. The limiting level of the rectifier cells 42, 43 is derived from a cathode resistor 45 connected in the cathode circuit of the triode 44, for which purpose the rectifier 42 is connected to the end of the cathode resistor 45 facing the cathode of the triode 44, while the junction point of the rectifier cells is connected, via a resistor 46, to a centre tapping of the cathode resistor 45. The limited signals are amplified in the triode amplifier 44 and supplied to a low-pass filter 47 having a limit frequency of 4 kc./s., in which in the manner as described in FIGURE 1, a volume compression of the speech signals as well as a pilot signal varying in its amplitude inversely proportional to the speech level is obtained, which signals are derived from the output terminals 48.

In the embodiment shown, the adjustment of the lower limit of the compression control range is obtained by supplying a small positive direct voltage to the output circuit 28 of the compression voltage rectifier 26, 27 which voltage is taken from a potentiometer 50 connected between the positive voltage terminal 49 and earth. In this manner, the push-pull modulator 31, will supply, also in the absence of speech signals, an output voltage which, as already described above, determines the lower limit of the compression control range.

FIGURE 4 is a modification of the transmitter shown in FIGURE 1. Corresponding elements have been indicated by the same numerals.

In the embodiment shown, the pilot frequency is chosen so that the difference frequency with the frequency of the carrier wave oscillator 13 connected to the push-pull modulator 12 flanks the signal band. If, for example, the signal band amounts to 0.3–3.4 kc./s. and the frequency of the carrier wave oscillator 13 is 20 kc./s., the frequency of the pilot generator 18 is approximately 16.3 kc./s., so that in this manner the frequency distance between the speech band and the pilot signal is increased substantially. As in the device shown in FIGURES 1 and 3, the speech signals together with the pilot signal, are supplied to the limiter 15, possible intermodulation products between the speech signals and the pilot falling outside the speech band owing to the large frequency distance between the speech signal and the pilot signal. In circumstances it may be of importance, for example for realizing the highest transmission quality in the case of music transmission, to reduce these intermodulation products, although they are particularly weak, even further.

In order to ararnge the pilot signal in these devices in a frequency position adjoining the speech band, the output of the volume compression device is connected to two branches connected in parallel in which the first branch comprises a low-pass filter 51 having a limit frequency of 3.4 kc./s. and the second branch comprises the cascade arrangement of a pilot filter 54 having a pass-band of 16.1–16.5 kc./s., a frequency conversion stage 52 connected to the carrier wave oscillator 13 and a pilot filter 53 having a pass-band of 3.6–3.8 kc./s. At the output of the low-pass filter 51, the speech signal in the band of 0.3–3.4 kc./s. occurs and at the output of the pilot filter 53 the pilot signal in the frequency position of 3.6–3.8 m./c. per sec. adjoining the signal band of 0.3–3.4 kc./s., which two signals are transmitted by the transmitter.

In the choice stated of the frequency of the pilot generator 18 a considerable simplification of the apparatus is obtained, since in this case the auxiliary oscillator already present is used for the frequency conversion in the stage 52.

What is claimed is:

1. A volume compression system comprising a source of information signals, a source of oscillations of a frequency outside the frequency band of said signals, compression voltage rectifier means, means applying said singals to said rectifier means, amplitude modulator means, means applying the output of said rectifier means and said oscillations to said modulator means, amplitude limiter means, means applying said information signals and the output of said modulator means to said limiter means, the amplitude of the output of said modulator means applied to said limiter means being greater than said information signals, and means for deriving compressed signals connected to the output of said limiter means, said last-mentioned means comprising filter means for selecting the frequency band of said information signals and rejecting the frequency of said subcarrier oscillation.

2. A volume compression system comprising a source of information signals, a source of subcarrier oscillations of a frequency outside the frequency band of said signals, compression voltage rectifier means, means applying said signals to said rectifier means to produce a compression voltage, push-pull modulator means, means for applying said oscillations and compression voltage for modulating said oscillations with said compression voltage, amplitude limiter means, means applying said information signals and modulated oscillations to said limiter means to produce amplitude limited signals, said modulated oscillations having greater amplitude than said information signals, filter means for selecting the frequency band of said information signals and rejecting oscillations of the frequency of said subcarrier oscillation, and means applying said amplitude limited signals to said filter means to produce output signals.

3. The system of claim 2, in which the frequency of said oscillations is at least three times the highest frequency of said frequency band.

4. The system of claim 2, comprising amplifier means connected to amplify said modulated oscillations before they are applied to said limiter means.

5. A volume compression system comprising a source of information signals, a source of subcarrier oscillations, and a source of pilot oscillations, said subcarrier oscillations and pilot oscillations having frequencies outside the frequency band of said signals, compression voltage rectifier means, means applying said signals to said rectifier means to produce a compression voltage, modulator means, means applying said compression voltage and subcarrier oscillations to said modulator means to modulate said subcarrier oscillations, amplitude limiter means, means applying said signals, pilot oscillations, and modulated oscillations to said limiter means, said modulated oscillations having greater amplitude than said signals, filter means for selecting the frequency of said frequency band and rejecting signals of the frequency of said subcarrier oscillation, and means connecting said filter means to the output of said limiter means.

6. The system of claim 5, comprising means for applying said pilot oscillations to said rectifier means.

7. The system of claim 5, in which the frequency difference between said pilot and subcarrier oscillations is a frequency adjoining said frequency band, comprising frequency conversion means connected to the output of said limiter means, means applying said subcarrier oscillations to said frequency conversion means, and means combining the outputs of said filter means and said frequency conversion means.

References Cited in the file of this patent

UNITED STATES PATENTS 2,907,831 De Jager ------------- Oct. 6, 1959